United States Patent [19]

Kataoka et al.

[11] Patent Number: 5,004,964
[45] Date of Patent: Apr. 2, 1991

[54] CONTROL APPARATUS FOR VIBRATION DRIVEN MOTOR

[75] Inventors: Kenichi Kataoka, Yokohama; Takayuki Tsukimoto, Kawasaki, both of Japan

[73] Assignee: Canon Kabushiki Kaisha, Tokyo, Japan

[21] Appl. No.: 539,344

[22] Filed: Jun. 18, 1990

[30] Foreign Application Priority Data

Jun. 19, 1989 [JP] Japan ................................. 1-156557

[51] Int. Cl.$^5$ ............................................. H02N 2/00
[52] U.S. Cl. ..................................... 318/128; 310/51
[58] Field of Search ............... 318/116, 118, 114, 128, 318/127, 649; 310/51, 316, 319, 323, 326, 338

[56] References Cited

U.S. PATENT DOCUMENTS

| 4,588,934 | 5/1986 | Suzuki et al. | 318/128 |
|---|---|---|---|
| 4,594,636 | 6/1986 | Hamer et al. | 318/128 |
| 4,659,969 | 4/1987 | Stupak, Jr. | 318/114 |
| 4,700,148 | 10/1987 | Pauly | 318/128 |
| 4,810,922 | 3/1989 | Hirsch | 310/319 |
| 4,929,874 | 5/1990 | Mizuno et al. | 310/51 |
| 4,935,651 | 6/1990 | Hong et al. | 310/51 |

Primary Examiner—William M. Shoop, Jr.
Assistant Examiner—A. Jonathan Wysocki
Attorney, Agent, or Firm—Fitzpatrick Cella Harper Scinto

[57] ABSTRACT

A unit for attenuating frequency components generated in a sideband of a frequency of an AC voltage applied to an electro-mechanical energy conversion element. This attenuation is achieved by modulation performed in a speed control apparatus for a vibration driven motor. The control apparatus includes a filter for cutting frequency components of a smaller frequency difference (fd) or more of an absolute value of a frequency difference between a natural frequency of an n-th order vibration and a natural frequency of an (n−1)th- or (n+1)th-order. A filter output is input to a modulator in a driving circuit, and noise of the vibration driven motor can be greatly reduced.

15 Claims, 12 Drawing Sheets

CONTROL APPARATUS FOR VIBRATION DRIVEN MOTOR

BACKGROUND OF THE INVENTION:

1. Field of the Invention

The present invention relates to a method of controlling low-noise driving of a vibration driven motor used in OA equipment, an AF mechanism for a camera, or the like, and a control apparatus therefor.

2. Related Background Art

Conventional control means used in control of positions, speeds, and accelerations of vibration driven motors are arranged such that their parameters (e.g., phase compensation factors, proportion factors, integral factors, and differential factors) are determined from response characteristics (e.g., step response and frequency response) of the vibration driven motors on the basis of a control theory as in conventional DC motor control means.

When a vibration driven motor is to be controlled by modulating (e.g., amplitude modulation, frequency modulation, phase modulation, or pulse width modulation) an AC voltage applied to a vibration electro-mechanical energy conversion element, modulation frequency components and integral multiples of the modulation frequency component appear in a sideband (i.e., when a frequency bandwidth of the modulation frequency is defined as $f_1$, the sideband falls within the range from $f_0 - f_1$ to $f_0 - - + f_1$ or from $f_0 - mf_1$ to $f_0 + mf_1$ ($m = 2, 3, \ldots$)) of the frequency ($f_0$) of the AC voltage applied to the vibration driven motor.

In a conventional system having a primary low pass filter in a control loop, high-frequency components cannot be sufficiently attenuated, and an influence of the frequency components falling within the sideband described above typically appears, resulting in inconvenience.

This problem will be described with reference to FIG. 3. Referring to FIG. 3, a vibrator 1 is arranged by bonding a vibrating plate 1-b made of a metal material and an electro-mechanical energy conversion element 1-a made of a PTZ. When an AC electrical signal having a frequency equal to a natural frequency of nth-order vibrations in a direction perpendicular to the surface of the ring of the annular vibrator 1, a resonant displacement occurs in the ring by forcible oscillation, thereby frictionally driving a rotor 2 urged by the vibrator 1.

An electrode pattern (6-wave driving) printed on the electro-mechanical energy conversion element 1-a is shown in FIG. 4. In a conventional method of modulating an AC voltage, an AC electrical signal having a frequency equal to the natural frequency of the 5th-order vibration in a direction perpendicular to the surface of the ring and including the frequency components in the sideband described above is applied to the pattern, the 5th-order (6-wave driving) vibration in the direction perpendicular to the surface of the ring occurs at positions slightly offset from the desired 6th-order (6-wave driving) driving vibration.

Similarly, the (n+1)th- and 7th-order vibrations in a direction perpendicular to the surface of the ring also occur since the electrical signals include the frequency components of the sideband described above. A problem posed by the (n−1)th- and (n+1)th-order vibrations is noise. If the (n−1)th- and (n+1)th-order mechanical vibrations have a displacement of about 0.01 μm and the frequency of the displacement falls within an audible range, the vibration sound can be an audible sound. Even if the frequency does not fall within the audible range (20 kHz or less) but if a difference between or a sum of the frequency of the (n−1)th- or (n+1)th-order vibration and the nth-order vibration falls within the audible range, noise is generated upon contact between the rotor 2 and the vibrator 1.

SUMMARY OF THE INVENTION

It is an object of the present invention to provide a vibration driven motor which can minimize generation of an audible sound.

It is another object of the present invention to provide a driver for a vibration driven motor, wherein generation of an audible sound can be electrically reduced.

The above and other objects, features, and the advantages of the present invention will be apparent from the following detailed description in conjunction with the accompanying drawings.

DESCRIPTION OF THE PREFERRED EMBODIMENTS

Figure 1:
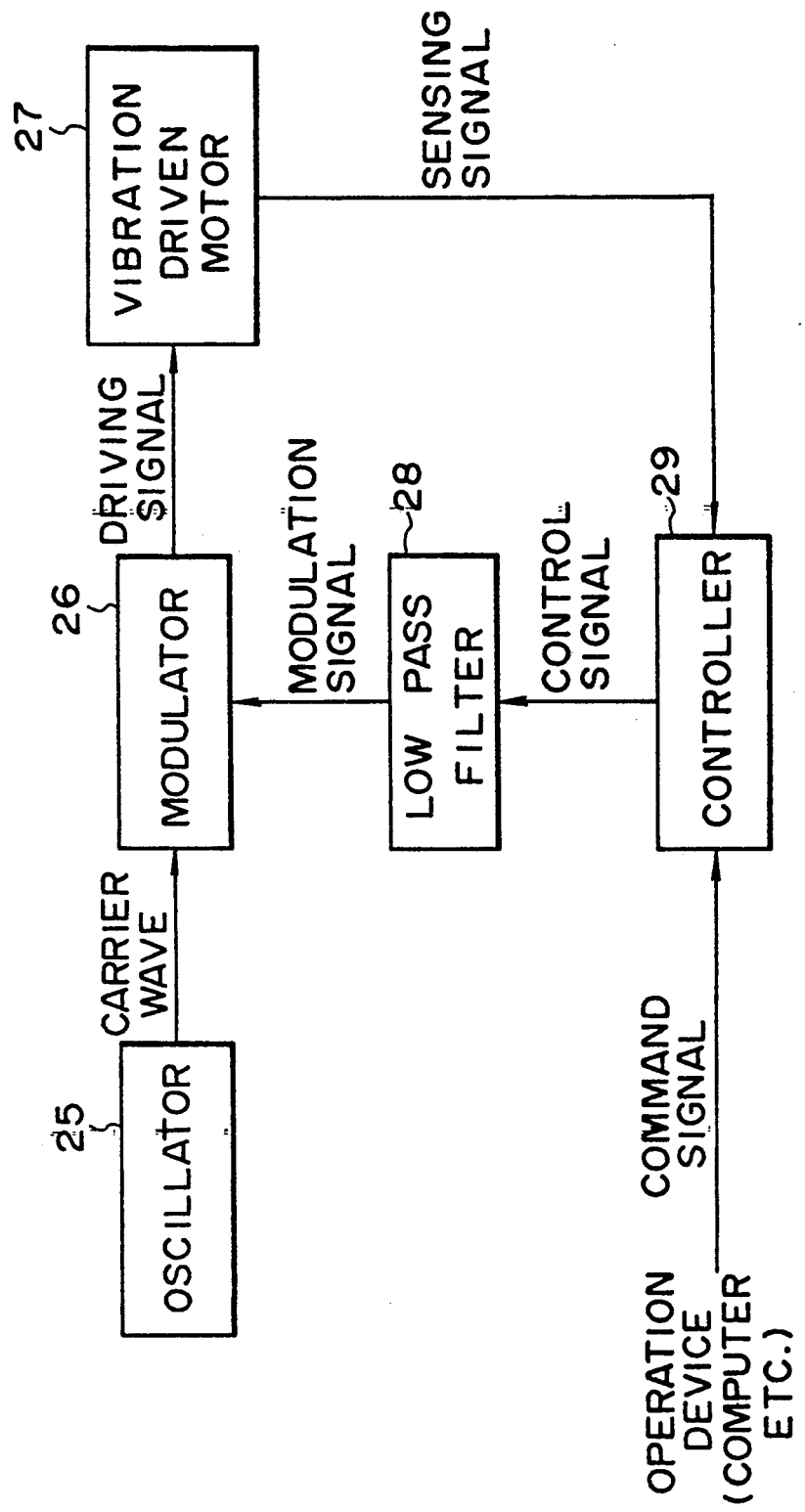
FIG. 1 is a block diagram showing the principle of the present invention.
Figure 3:
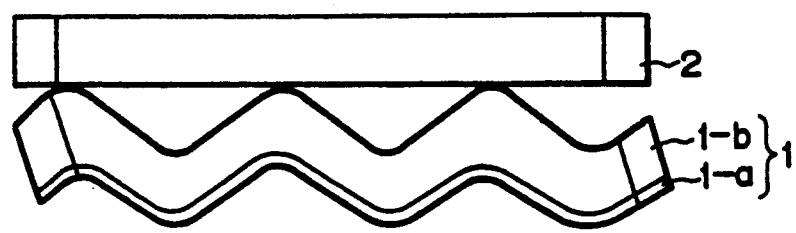
FIG. 3 is a view showing a structure of a vibration driven motor.

FIG. 1 is a block diagram showing the present invention. An oscillator 25 generates an AC voltage having a natural frequency of a vibrator to drive a vibrator of a vibration driven motor. A modulator 26 performs so-called modulation for changing various parameters such amplitude, phase, a, and a width in accordance with a modulation signal. A vibration driven motor 27 includes a vibrator 1 shown in FIGS. 3 and 4, a rotor 2 serving a moving member, and known elements such as vibration detection elements arranged in an electro-mechanical energy conversion element 1-a. A low pass filter 28 cuts a high-frequency component of a control signal. A controller 29 compares a command signal (e.g., a rotation speed signal) from an operation device (not shown) such as a computer with a sensing signal (e.g., a rotation speed signal) from the vibration driven motor 27 and supplies a control signal to the modulator 26 through the low pass filter 28 in accordance with a comparison result.

Figure 13A:
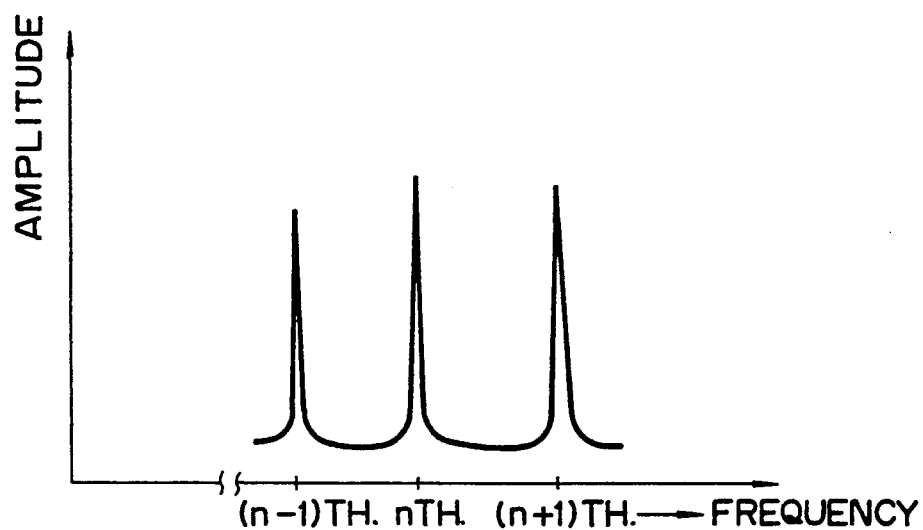
FIGS. 13A and 13B are graphs showing vibration characteristics of a vibrator, and bands of a modulation signal, a carrier wave, and a driving signal.
Figure 13B:
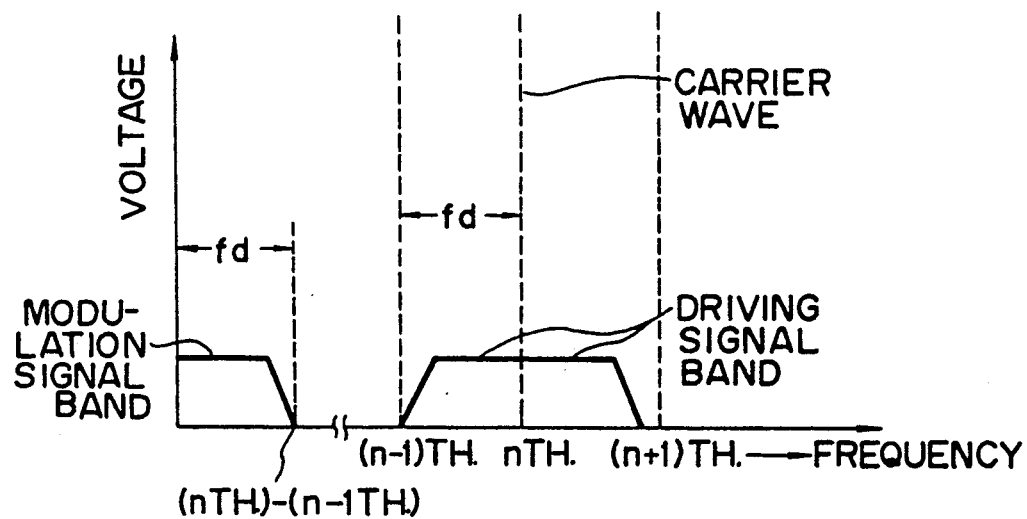

FIG. 13A shows characteristics of a vibration amplitude of the vibrator as a function of driving signal frequency of the vibration driven motor, and FIG. 13B show a frequency band of a modulation signal whose frequency band is limited by the low pass filter 28, a frequency band of a carrier wave, and a frequency band of a driving signal obtained by inputting the modulation signal into the modulator 26 to modulate the amplitude of the carrier wave. When the frequency band (the left portion of FIG. 13B) of the modulation signal is limited by the low pass filter 28 having a steep cutoff frequency curve, the driving signal does not contain the $(n-1)$th- and $(n+1)$th-order natural frequencies. Therefore, the vibration driven motor can be driven without causing $(n-1)$th- and $(n+1)$th-order vibrations.

First Embodiment

Figure 2:
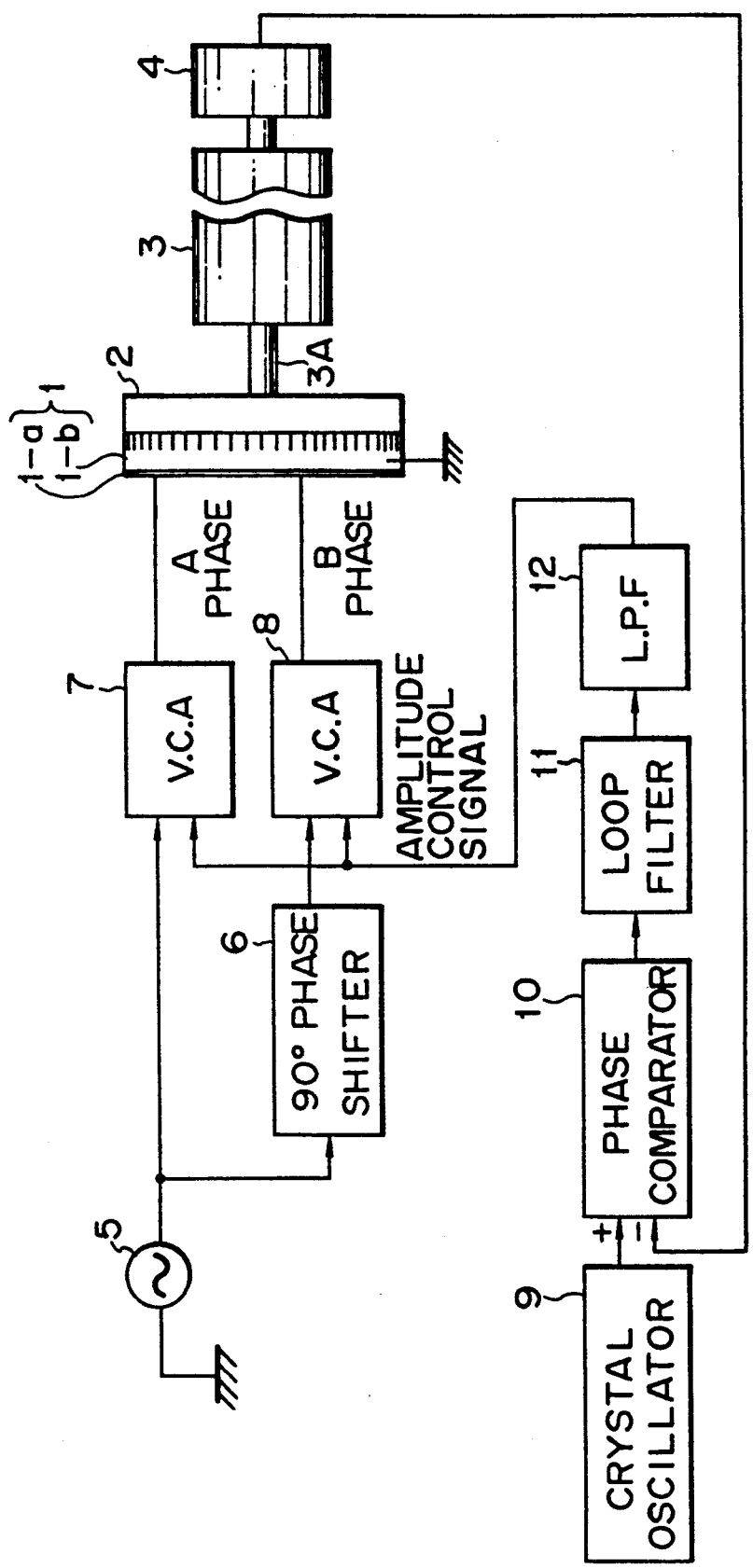
FIG. 2 is a block diagram showing a circuit for controlling a speed by an amplitude of an AC voltage applied to a vibrator.

FIG. 1 is a block diagram showing the principle of the present invention, and a control circuit corresponding to this principle is shown in FIG. 2.

Figure 5A:
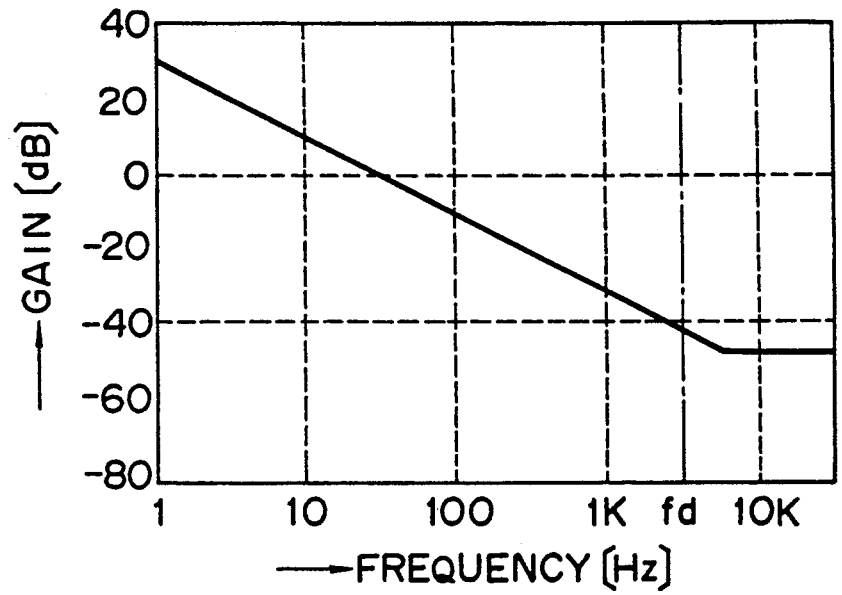
FIGS. 5A and 5B are graphs showing characteristics of a loop filter and a low pass filter, respectively.
Figure 5B:
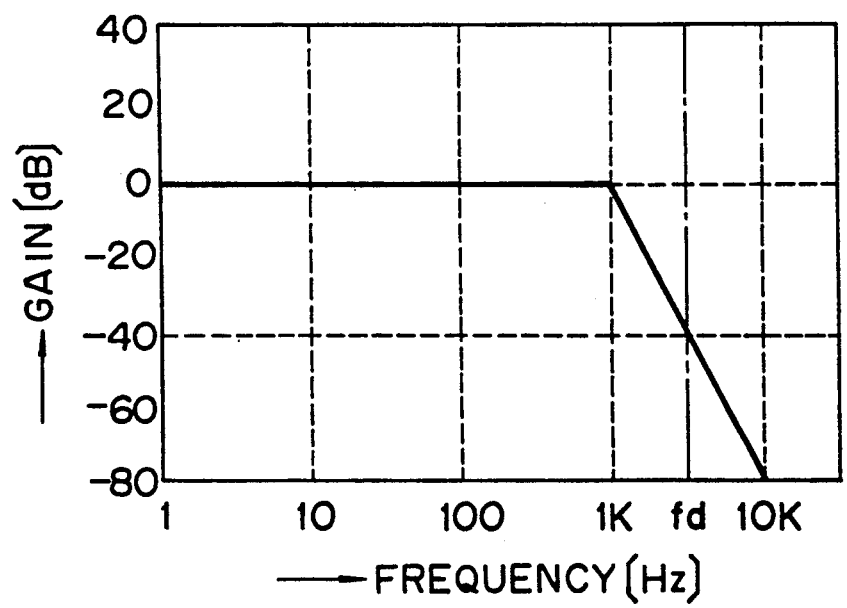
Figure 6A:
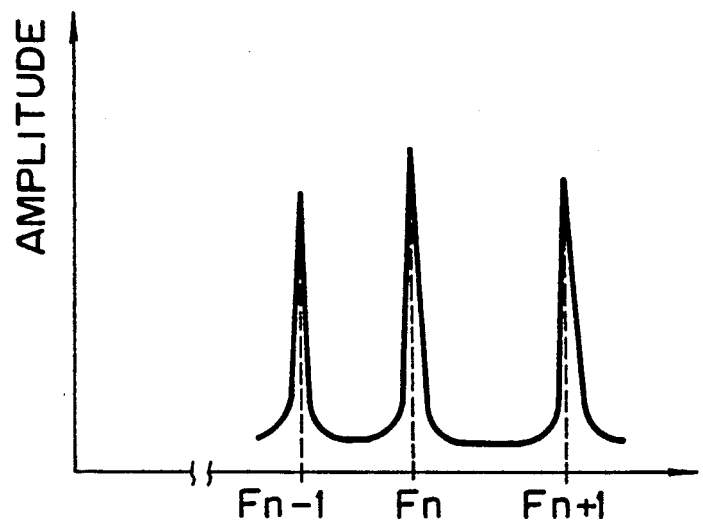
FIGS. 6A and 6B are graphs showing vibration characteristics of the vibrator and frequency components of an AC voltage applied to the vibrator, respectively.
Figure 6B:
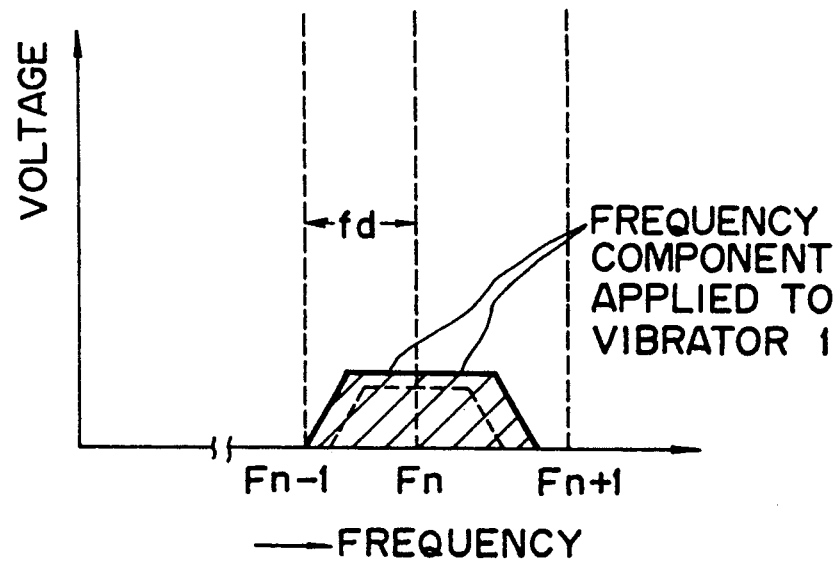

FIG. 2 is a block diagram of a speed control circuit for a vibration driven motor. A known vibrator 1 is arranged by bonding an electro-mechanical energy conversion element 1-a made of a PTZ or the like to a vibrating plate 1-b made of a metal material. A rotor 2 is urged against the vibrator 1 at a proper pressure and is frictionally driven by a travelling vibration wave excited by the vibrator 1. A printer platen roller 3 is connected to the vibration driven motor constituted by the vibrator 1 and the rotor 2 and serves as an object to be driven at a given speed. A rotary encoder 4 is connected to the roller 3 at a position opposite to a rotating shaft 3A connected to the vibration driven motor. The rotary encoder 4 is used to detect a speed of the vibration driven motor. An oscillator 5 comprises a known oscillator for generating an AC voltage for driving the vibration driven motor. A phase shifter 6 comprises a known 90° phase shifter for shifting a phase of an output signal from the oscillator 5 by 90°. A voltage-controlled amplifier (V.C.A) 7 comprises a known V.C.A for changing an amplitude of an output signal from the oscillator 5 in accordance with an amplitude control signal and generating an AC voltage to the A phase of the electro-mechanical energy conversion element 1-a. A voltage-controlled amplifier (V.C.A) 8 comprises a known V.C.A for changing an amplitude of an output signal from the 90° phase shifter 6 in accordance with an amplitude control signal (to be described later) and generating an AC voltage to the B phase of the electro-mechanical energy conversion element 1-a. A crystal oscillator 9 generates pulses having a period corresponding to a reference speed. A phase comparator 10 comprises a known phase comparator for comparing an output from the rotary encoder 4 with an output from the crystal oscillator 9. The phase comparator 10 constitutes a P.L.L (Phase-Locked Loop). A loop filter 11 comprises a known loop filter for attenuating output noise of the phase comparator 10 and determining synchronous and response characteristics of the PLL. The phase comparator 10 and the loop filter 11 constitute the PLL. A low pass filter (L.P.F) 12 eliminates frequency components having a smaller frequency difference (fd) or more from the frequency components of an output signal from the loop filter 11 in accordance with a steep cutoff frequency curve and outputs the amplitude control signal. FIG. 5A shows a gain of the loop filter 11 as a function of frequency characteristics, and FIG. 5B shows a gain of the low pass filter 12 as a function of frequency characteristics. FIG. 6A shows a vibration amplitude of the vibrator 1 as a function of frequency characteristics, and FIG. 6B shows frequency components included in the AC voltage applied to the vibrator 1.

An operation for controlling the speed according to the present invention will be described with reference to FIGS. 2, 5A, 5B, 6A, and 6B. When the speed of the platen roller 3 is decreased during the operation, the phase of an output pulse from the rotary encoder 4 is delayed from the phase of the speed control reference pulse signal from the crystal oscillator 9. For this reason, an average value of outputs from the phase comparator 10 is increased, and an amplitude control signal obtained through the loop filter 11 and the low pass filter 12 is increased accordingly. The amplitudes of the AC voltage components applied to the A and B phases of the electro-mechanical energy conversion element 1-a are increased by the voltage-controlled amplifiers (V.C.As) 7 and 8. The vibration amplitude of the vibrator 1 is also increased, and then the speed of the vibration driven motor is increased. The speed of the roller 3 is automatically controlled to a speed corresponding to the reference pulse signal. The part associated with the gist of the present invention will be described in more detail below.

In general, when a high-precision speed control system is to be designed, a frequency of an output from an encoder must be higher than several kHz in order to increase the number of speed detection rotary encoder output pulses per revolution. When such a rotary encoder is used as the rotary encoder 4 shown in FIG. 1, the frequency components of the output signal from the phase comparator 10 include frequency components having frequencies of several tens of kHz or more if high-frequency components generated by the operational principle of the phase comparator 10 and frequency components of rotational fluctuations of the roller 3 are included. In this case, as is apparent from the graph shown in FIG. 5A, speed control characteristics (e.g., response characteristics) must be sacrificed as in a decrease in total gain upon a decrease in the smaller frequency difference fd when only a loop filter in a conventional PLL is used. Sufficient attenuation of the high-frequency components cannot be achieved without this sacrifice.

The characteristic feature of the present invention lies in that the high-frequency components can be sufficiently attenuated without sacrificing the low-frequency control characteristics by using a steep attenuation characteristic curve of the low pass filter 12. More specifically, assume that a frequency of a carrier wave is defined as $f_0$ and that a frequency of a modulation wave is defined as $f_1$. Under these assumptions, $(f_0+f_1)$ and $(f_0-f_1)$ sideband signals are generated according to the principle of AM modulation. When the frequency band of $f_1$, i.e., the frequency band of the amplitude control signal shown in FIG. 2 is limited by the filter 12 using the frequency difference fd as a boundary, as shown in FIG. 5B, the frequency components of the AC voltages applied to the A and B phases of the electro-mechanical energy conversion element 1-a are given as characteristics indicated by a hatched portion in FIG. 6B. The (n−1)th and (n+1)th mode frequency components ($F_{n-1}$ and $F_{n+1}$ (FIGS. 6A and 6B)) become very small. The (n−1)th and (n+1)th mode vibrations are not generated, and motor control free from noise and degradation of speed control characteristics can be achieved.

The characteristics of the low pass filter 12 are preferably set such that the high-frequency components are abruptly attenuated with respect to the frequency difference fd as a boundary. However, this abrupt decrease may occur using a frequency of about fd/50 as a boundary without posing any problems.

In this case, the speed control characteristics (e.g., speed response) are degraded by a decrease in frequency difference, but do not cause any practical problem. In addition, the frequency component of the AC voltage applied to the vibrator 1 has a narrow band, as indicated by a dotted line in FIG. 6B. Therefore, a possibility for generating noise can be minimized.

For illustrative convenience, the loop filter 11 and the low pass filter (L.P.F) 12 are divided as independent units, but can be apparently constituted by a single unit having the characteristics shown in FIG. 5B.

The response characteristics to the amplitude control signals from the voltage-controlled amplifiers (V.C.As) 7 and 8 can be set to have the same frequency characteristics as in an arrangement including the low pass filter (L.P.F) 12. In this case, the low pass filter (L.P.F) 12 can be omitted.

Second Embodiment

Figure 7:
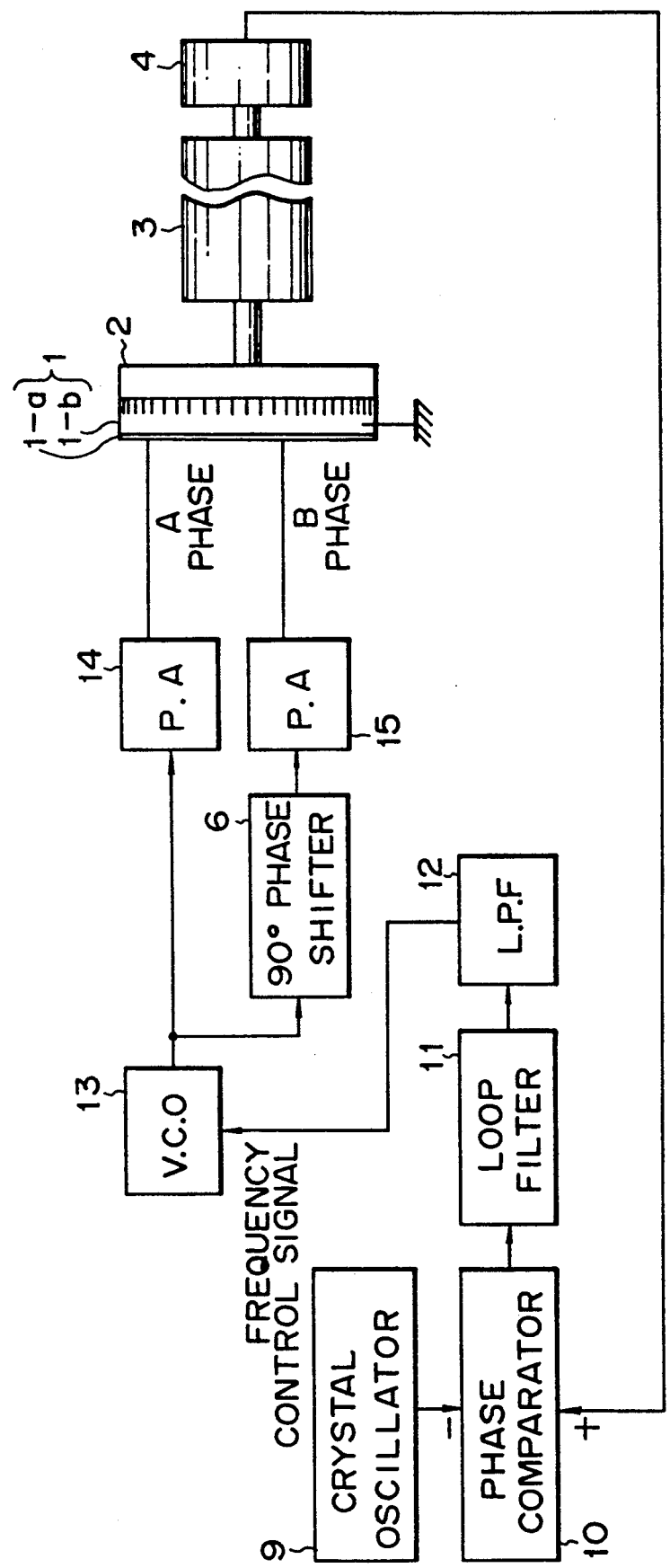
FIG. 7 is a block diagram showing a circuit for controlling a speed by a frequency of an AC voltage applied to the vibrator.

The first embodiment exemplifies a control circuit wherein the amplitude of the AC voltage applied to the electro-mechanical energy conversion element 1-a is changed to control the speed. However, the frequency of the AC voltage can be changed to control the speed, as will be described with reference to a control circuit of the second embodiment. FIG. 7 is a block diagram of the control circuit according to the second embodiment. This control circuit includes a voltage-controlled oscillator (V.C.O) 13 for outputting an AC voltage having a frequency corresponding to a frequency control signal, and amplifiers 14 and 15 for amplifying output signals from the voltage-controlled oscillator (V.C.O) 13 and a 90° phase shifter 6 and applying AC voltage components to the A and B phases of an electro-mechanical energy conversion element 1-a. An operation of the second embodiment will be briefly described below. In the first embodiment, the speed is increased when the amplitude of the AC voltage applied to the electro-mechanical energy conversion element is increased. Unlike in the first embodiment, according to the second embodiment, the speed is increased when a frequency of the AC voltage comes near a resonant frequency within a frequency range exceeding a resonant frequency of the vibration mode used for vibrating a vibrator 1. More specifically, when the frequency of the AC voltage is decreased within the frequency range described above, the speed is increased. When the sign of the input to the phase comparator 10 is reversed, the same control operation as in the first embodiment can be performed.

The frequency components of the AC voltage under the above frequency control will be described below. When the frequency of the AC voltage is changed according to a theory of frequency modulation (to be referred to as FM modulation hereinafter) to control the speed, the frequency components of the AC voltage include infinite frequency components. However, the frequency band of the AC voltage obtained upon a small change in width of the frequency under constant speed control falls within the range of $F_{n-1}$ to $F_{n+1}$ bands shown in FIGS. 6A and 6B, as in the first embodiment. In the same manner as previously described, frequency components having frequencies higher than the smaller frequency difference (fd) are eliminated by a steep cutoff frequency characteristic curve of an LPF 12. When the resultant frequency control signal is supplied to the V.C.O 13, the frequency components of the AC voltage output from the V.C.O 13 can be represented by the hatched portion in FIG. 6B. The frequency components corresponding to the (n−1)th and (n+1)th modes in the AC voltage can be minimized. The (n−1)th and (n+1)th mode vibrations can be eliminated, and therefore the same effect as in the first embodiment can be obtained.

Third Embodiment

Figure 4:
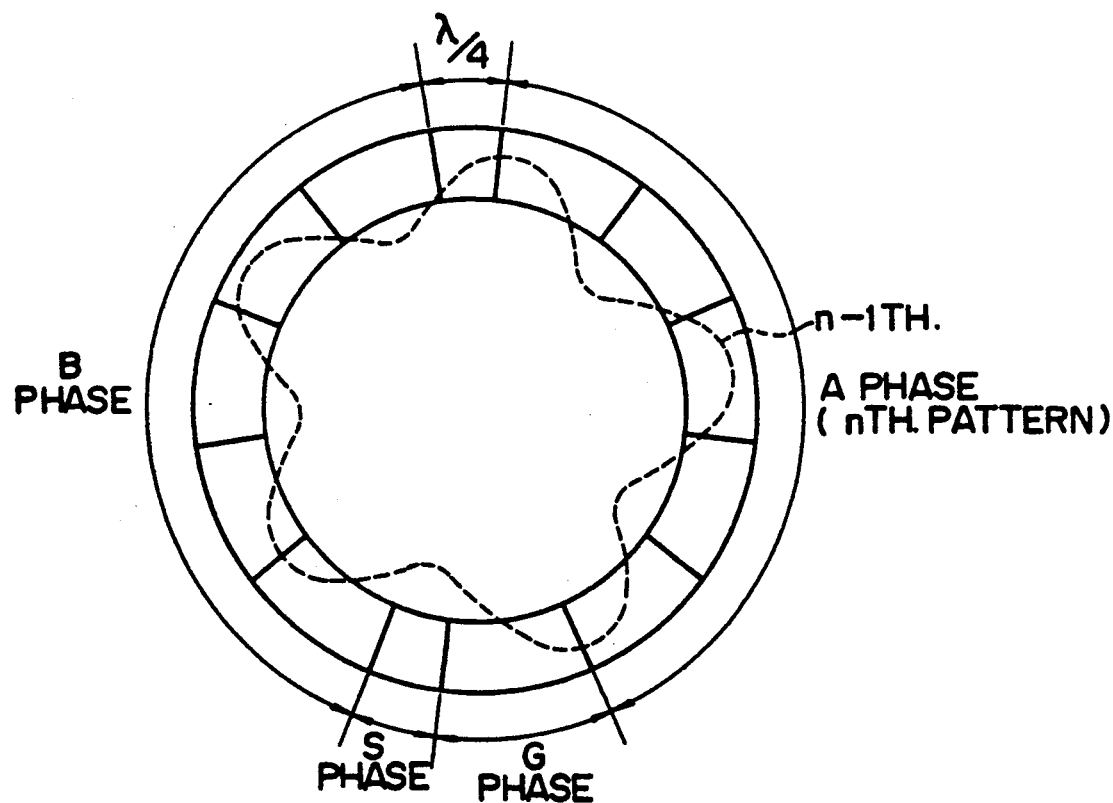
FIG. 4 is a view for explaining a vibration mode.
Figure 8:
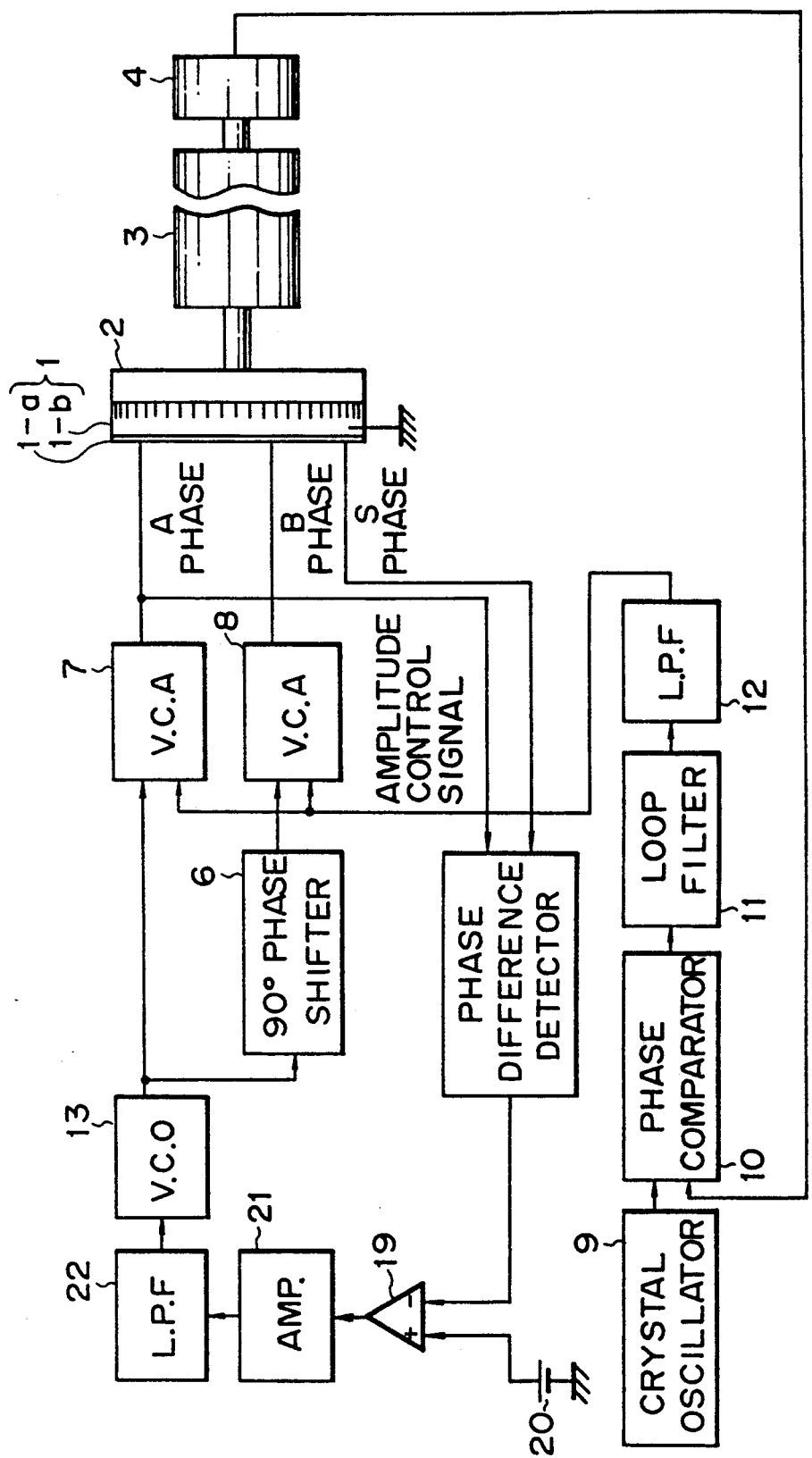
FIG. 8 is a block diagram showing a circuit obtained by adding a frequency control circuit to the arrangement shown in FIG. 2 to allow the vibrator to always vibrate at its natural frequency for stabilization control.

A control circuit in the third embodiment is obtained by adding a frequency control circuit to the circuit of the first embodiment. This frequency control circuit controls a frequency of an AC voltage applied to a vibrator 1 to the natural frequency of the vibrator 1, as shown in FIG. 8. An operation of the frequency control circuit will be briefly described below. An electro-mechanical energy conversion element 1-a made of a piezoelectric element is fixed to the vibrator 1. As shown in FIG. 4, the electro-mechanical energy conversion element 1-a has driving electrodes consisting of the A and B phases, and an S phase electrode for detecting a vibrating state of the vibrator 1 in real time. When an AC voltage near the natural frequency of the vibrator 1 is applied to the vibrator 1 and the frequency of the AC voltage is increased, the phase of an output signal from the S phase electrode is delayed from the corresponding time phase of the AC voltage applied to the A or B phase. A time phase difference between the AC voltage applied to the A phase and the AC voltage detected by the S phase is detected by a phase difference detector 30. Alternatively, a difference between the time phase difference and a phase difference command set by a battery 20 or any other reference voltage setter is obtained by a differential amplifier 19. The resultant signal is amplified by an amplifier 21. The amplified signal is input to a voltage-controlled oscillator (V.C.O) 13 through a low pass filter (L.P.F) 13 to control the frequency. If the output from the phase difference detector 30 is larger than the value represented by the phase difference command, an output from the differential amplifier 19 has a negative value. An output from the low pass filter (L.P.F) 22 is decreased, and the frequency of the output signal from the voltage-controlled oscillator (V.C.O) 13 is decreased. A time phase difference between the time phase of the AC voltage applied to the A phase and the phase of the signal detected by the S phase is decreased. Therefore, the frequency is controlled so that the output from the phase difference detector 30 becomes equal to the value represented by the phase difference command. At this time, the same effect as in the low pass filter (L.P.F) 12 in the first embodiment can be obtained in the third embodiment.

Fourth Embodiment

Figure 9:
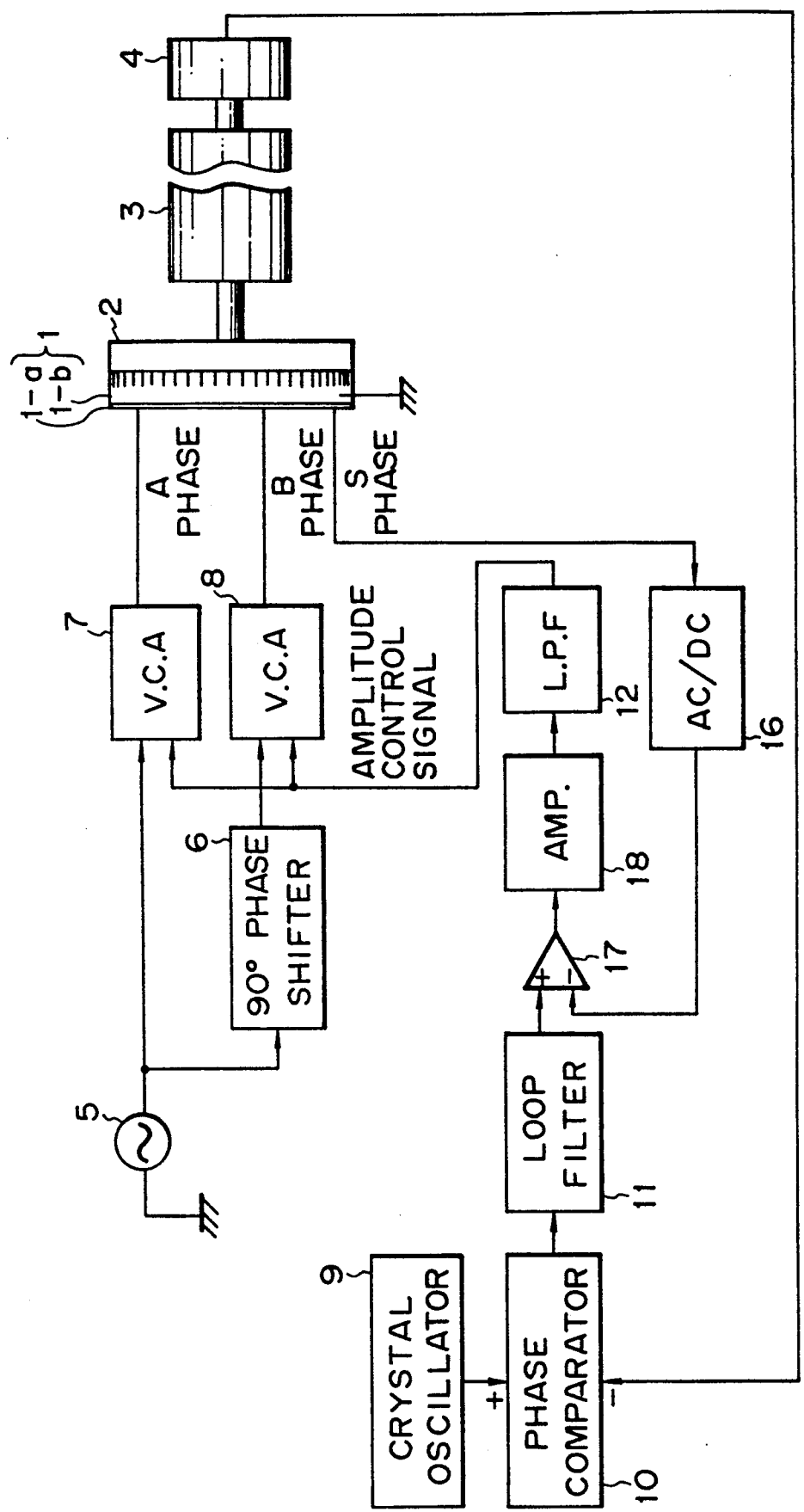
FIG. 9 is a block diagram showing a circuit obtained by adding a vibrator amplitude control circuit to the arrangement in FIG. 2.

FIG. 9 shows a circuit for controlling a vibration amplitude of a vibrator 1 so as to improve the frequency response characteristics of the speed control circuit of the first embodiment. An amplitude of a signal corresponding to the vibration of the vibrator 1 and detected by an S phase (vibration detection electrode) is converted into a DC signal by an AC/DC converter 16 and the DC signal is fed back to perform minor loop control, thereby setting the amplitude to correspond to that of an output signal from a loop filter 11. Although the amplitude of the AC voltage applied to the A and B phases is directly controlled in accordance with the speed difference in the first embodiment, a vibration amplitude command signal for the vibrator 1 is supplied to a vibration amplitude control circuit for the vibrator 1 as a minor loop, and the vibration amplitude is controlled by the minor loop in accordance with the speed difference.

An operation of the fourth embodiment will be briefly described below. When the speed is decreased, an output which serves as a vibration amplitude command from the lop filter 11 is increased. An output from a differential amplifier 17 is increased, and a signal which is amplified by an amplifier 18 and the high-frequency component of which is cut by a low pass filter (L.P.F) 12 is input to voltage-controlled amplifiers (V.C.As) 7 and 8. The vibration amplitude of the vibrator 1 is increased, and the output signal amplitude of the S phase (vibration detection electrode) is increased. A signal converted into the DC voltage by the AC/DC converter 16 and corresponding to the vibration amplitude of the vibrator 1 is increased. High-speed control is performed such that positive and negative input signals to the differential amplifier 17 become equal to each other. Even in a circuit including such a minor loop, the amplitude command signal input to the voltage-controlled amplifier (V.C.As) 7 and 8 for controlling the AC voltage components applied to the A and B phases is filtered through the low pass filter (L.P.F) 12, thereby obtaining the same effect as in the first embodiment.

Fifth Embodiment

Figure 10A:
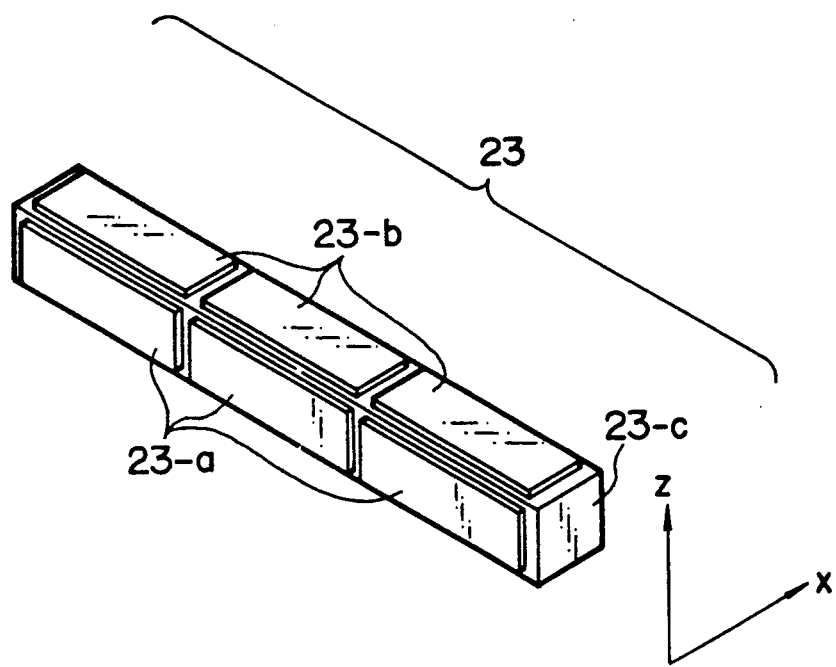
FIGS. 10A and 10B are perspective views showing an arrangement of a rod-like vibrator.
Figure 10B:
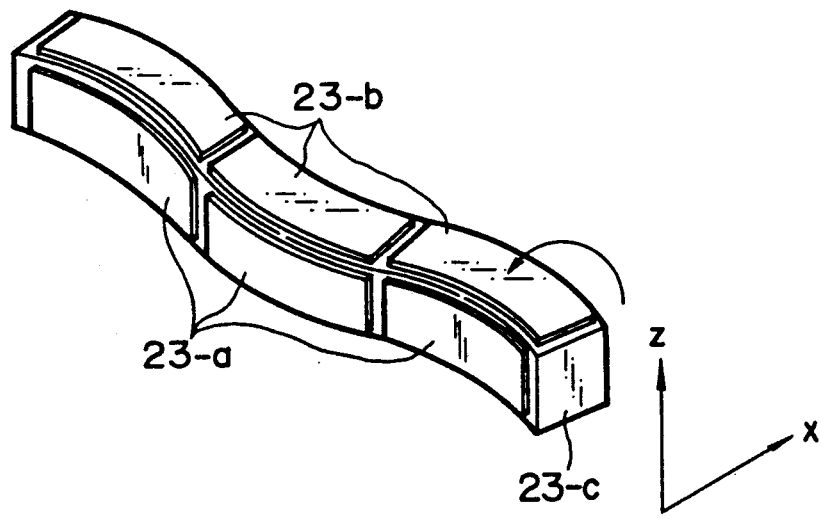
Figure 11:
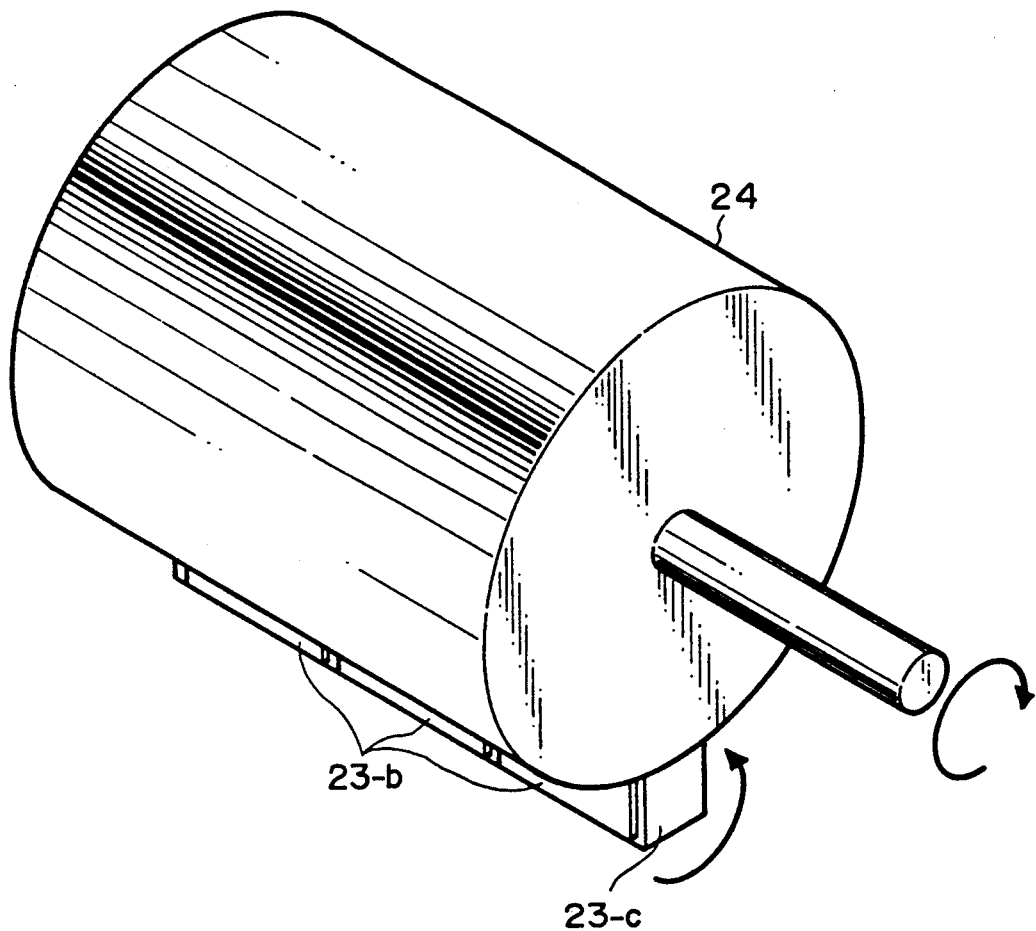
FIG. 11 is a perspective view showing a vibration driven motor including the rod-like vibrator.
Figure 12:
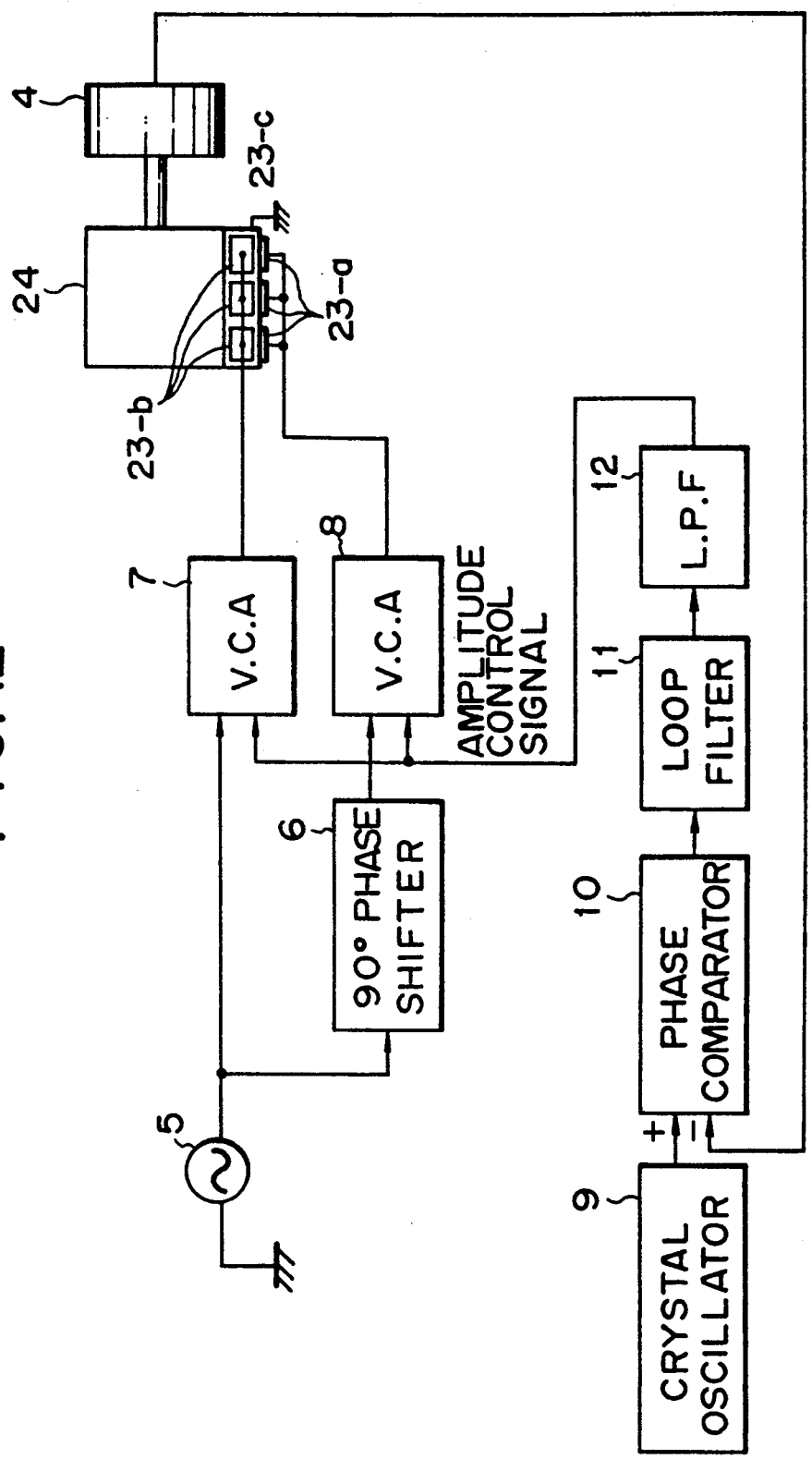
FIG. 12 is a block diagram showing a speed control circuit for a vibration driven motor including the rod-like vibrator.

The annular vibrators have been used in the first to the fourth embodiments. A vibration driven motor utilizing a rod-like vibrator shown in FIG. 10 will be described below. FIG. 11 shows an arrangement of a rotary motor using the rod-like vibrator. The principle of operation will be described with reference to FIGS. 10 and 11 below. A rod-like vibrator 23 comprises an electro-mechanical energy conversion element 23-a used for x-axis vibration, an electro-mechanical energy conversion element 23-b used for z-axis vibration, and a metal square rod 23-c. When an AC voltage having natural frequency of a third-order vibration of the square rod 23 is applied to the electro-mechanical energy conversion element 23-a, x-axis vibration occurs, as shown in FIG. 10B. When an AC voltage which has a frequency corresponding to the natural frequency of third-order vibration and is out of 90° from the time phase of the AC voltage applied to the electro-mechanical energy conversion element 23-a is applied to the electro-mechanical energy conversion element 23-b, the rod-like vibrator 23 performs circular motion in a direction indicated by an arrow in FIG. 10B. When the rod-like vibrator 23 is brought into tight contact with a roller 24 the roller 24 is rotated in a direction opposite to the rotational direction of vibration of the rod-like vibrator 23, as shown in FIG. 11. FIG. 12 shows a motor speed control circuit using the rod-like vibrator. The principle of operation is the same as that in the first embodiment. A low pass filter (L.P.F) has a cutoff frequency lower than a smaller frequency difference of an absolute value difference between the third-order natural frequency of the rod-like vibrator and the second- or fourth-order natural frequency of the rod-like vibrator. The frequency components larger than the smaller frequency difference are cut in accordance with a steep characteristic curve, thus obtaining the same effect as in the first embodiment.

Sixth Embodiment

An operation of the low pass filter (L.P.F) 12 in each of the first to fifth embodiments may be performed by a digital scheme. For example, when output timings are determined to be longer than the time interval larger than ($\frac{1}{2}$fd) (where fd is defined in FIG. 13B), the frequency components having a frequency difference fd or more are attenuated to obtain the same effect as in the first embodiment.

The present invention having the above arrangements has the following effects.

(1) A modulation wave parameter (amplitude, frequency, and the like) control signal) is filtered through a low pass filter having a steep frequency characteristic curve and a cutoff frequency lower than a smaller frequency difference of $(f_n - f_{n-1})$ and $(f_{n+1} - f_n)$ (where $f_n$ is the nth-order (driving mode) natural frequency, and $f_{n-1}$ and $f_{n+1}$ are the (n−1)th- and (n+1)th-order natural frequencies). Thereafter, an AC signal for driving the vibration driven motor is modulated to eliminate generation of vibration components except for the driving natural frequency, thereby reducing generation of audible sounds.

(2) The vibration components except for the driving vibration components can be reduced due to the above reason. The various control operations such as speed and positional control operations can be stabilized, wow and flutter can be reduced, and positional precision can be improved.

What is claimed is:

1. A vibration driven motor comprising:
   (a) a vibration member;
   (b) an electro-mechanical energy conversion element connected to said vibration member and responsive to an applied driving signal for reproducing a vibration in said vibration in said variation member, thereby to cause relative movement between said vibration member and a frictional member in contact with said vibration member;
   (c) a modulating member functionally connected to said element for applying to said element said driving signal having a frequency for generating an nth-order (where n is an integer) vibration in said vibration member;
   (d) a detecting member for generating a detecting signal corresponding to a vibrating state of said vibration member;
   (e) a comparator for receiving said detecting signal and a reference signal and producing a signal corresponding to a difference between said detecting signal and said reference signal; and (f) a filter connected to said modulating member for filtering frequencies of not more than a smaller value of $|n-(n-1)|$ and $|(n+1)-n|$ (where n is a frequency of said driving signal for generating the nth-order vibration in said vibration member, $(n+1)$ is a frequency of said driving signal for generating the $(n+1)$th-order vibration in said vibration member, and $(n-1)$ is a frequency of said driving signal for generating the $(n-1)$th-order vibration in said vibration member) represented by difference signals from said comparator, and for causing said modulating member to receive an electrical signal corresponding to the filtered frequencies, wherein said driving signal is modulated by said modulating member in accordance with the electrical signal from said filter.

2. A vibration driven motor according to claim 1, wherein said filter includes a low pass filter connected to said modulating member.

3. A vibration driven motor according to claim 1, wherein said reference signal corresponds to a speed of the motor.

4. A vibration driven motor according to claim 1, wherein said detecting member comprises an encoder for generating a signal corresponding to a moving speed of said frictional member.

5. A vibration driven motor according to claim 4, wherein said frictional member includes a rotor driven by said vibration in said vibration member.

6. A vibration driven motor according to claim 4, wherein said encoder includes a rotary encoder engaged with said rotor.

7. A vibration driven motor according to claim 4, wherein said comparator includes a phase comparator for comparing a phase of said signal from said encoder with a phase of said reference signal.

8. A vibration driven motor according to claim 7, wherein said phase comparator includes a phase locked loop.

9. A vibration driven motor according to claim 5, wherein said rotor includes a printer platen roller.

10. A vibration driven motor comprising:
(a) a vibration member;
(b) a frictional member in contact with said vibration member;
(c) an electro-mechanical energy conversion element fixed to said vibration member and responsive to an applied driving signal for reproducing a travelling vibration core in said vibration member, thereby to cause relative movement between said vibration member and said frictional member;
(d) a modulator functionally connected to said element for applying to said element said driving signal having a frequency for generating an nth-order (where n is an integer) vibration in said vibration member;
(e) a detecting member for generating a detecting signal corresponding to a vibrating state of said vibration member;
(f) a comparator for receiving said detecting signal and a reference signal and producing a signal corresponding to a difference between said detecting signal and said reference signal; and
(g) a filter connected to said modulating member for filtering frequencies of not more than a smaller value of $|n-(n-1)|$ and $|(n+1)-n|$ (where n is a frequency of said driving signal for generating the nth-order vibration in said vibration member, $(n+1)$ is a frequency of said driving signal for generating the $(n+1)$th-order vibration in said vibration member, and $(n-1)$ is a frequency of said driving signal for generating the $(n-1)$th-order vibration in said vibration member) represented by difference signals from said comparator, and for causing said modulating to receive an electrical signal corresponding to the filtered frequencies, wherein said driving signal is modulated by said modulating member in accordance with the electrical signal from said filter.

11. A vibration driven motor according to claim 10, wherein said filter includes a low pass filter connected to said modulating member.

12. A vibration driven motor according to claim 10, wherein said reference signal corresponds to a speed of the motor.

13. A vibration driven motor according to claim 10, wherein said detecting member comprises an encoder for generating a signal corresponding to a moving speed of the frictional member.

14. A vibration driven motor comprising:
(a) a vibration member;
(b) an electro-mechanical energy conversion element connected to said vibration member and responsive to an applied driving signal for reproducing a vibration in said vibration member, thereby to cause relative movement between said vibration member and a frictional member in contact with said vibration member;
(c) a modulator functionally connected to said element for applying to said element said driving signal having a frequency for generating an nth-order (where n is an integer) vibration in said vibration member;
(d) a detecting member for generating a detecting signal corresponding to a vibrating state of said vibration member;
(e) a comparator for receiving said detecting signal and a reference signal and producing a signal corresponding a difference between said detecting signal and said reference signal; and
(f) means for controlling said modulator so as not to include $(n-1)$th- and $(n+1)$th-order (where $(n-1)$ is a frequency of said driving signal for generating an $(n-1)$th-order vibration in said vibration member and $(n+1)$ is a frequency of said driving signal for generating an $(n+1)$th-order vibration in said vibration member) frequencies in said driving signal from said modulator in response to the difference signal from said comparator.

15. A vibration driven motor according to claim 14, wherein said control means includes a low pass filter connected between said comparator and said modulator.

* * * * *

UNITED STATES PATENT AND TRADEMARK OFFICE
CERTIFICATE OF CORRECTION

PATENT NO. : 5,004,964
DATED : April 2, 1991
INVENTOR(S) : KENICHI KATAOKA, ET AL.

It is certified that error appears in the above-identified patent and that said Letters Patent is hereby corrected as shown below:

COLUMN 1

Line 25, "modulation" should read --components of the modulation.--.
Line 26, "components" should be deleted.
Line 27, "component" should be deleted.
Line 30, "$f_0--+f_1$" should read --$f_0+f_1$--.

COLUMN 2

Line 65, "such" should read --such as--.
Line 66, "a," (first occurrence) should read --frequency, and--.

COLUMN 4

Line 54, "fd" should read --(fd)--.

COLUMN 8

Line 24, "fd" should read --(fd)--.
Line 29, "signal)" should read --signal--.
Line 53, "in said variation" should be deleted.

COLUMN 9

Line 51, "core" should read --wave--.

UNITED STATES PATENT AND TRADEMARK OFFICE
CERTIFICATE OF CORRECTION

PATENT NO. : 5,004,964

Page 2 of 2

DATED : April 2, 1991

INVENTOR(S) : KENICHI KATAOKA, ET AL.

It is certified that error appears in the above-identified patent and that said Letters Patent is hereby corrected as shown below:

COLUMN 10

Line 14, "modulating" should read --modulating member--.
Line 48, "sponding a" should read --sponding to a--.

Signed and Sealed this

Twentieth Day of October, 1992

Attest:

DOUGLAS B. COMER

Attesting Officer

Acting Commissioner of Patents and Trademarks